(12) United States Patent
Erdloff

(10) Patent No.: US 6,912,796 B2
(45) Date of Patent: Jul. 5, 2005

(54) ASSEMBLY AID

(75) Inventor: Dirk Erdloff, Burglauer (DE)

(73) Assignee: Preh-Werke GmbH & Co., Bad Neustadt (DE)

( * ) Notice: Subject to any disclaimer, the term of this patent is extended or adjusted under 35 U.S.C. 154(b) by 0 days.

(21) Appl. No.: 10/460,200

(22) Filed: Jun. 13, 2003

(65) Prior Publication Data

US 2003/0230001 A1 Dec. 18, 2003

(30) Foreign Application Priority Data

Jun. 13, 2002 (DE) .......................................... 102 26 302

(51) Int. Cl.$^7$ .............................................. G01D 21/00
(52) U.S. Cl. .......................................... 33/645; 33/613
(58) Field of Search ........................ 33/613, 645, 533, 33/562, 194, 528, DIG. 10

(56) References Cited

U.S. PATENT DOCUMENTS

| | | | | |
|---|---|---|---|---|
| 4,345,381 A | * | 8/1982 | Brislin ......................... | 33/528 |
| 4,998,355 A | * | 3/1991 | Greene ......................... | 33/667 |
| 5,181,325 A | * | 1/1993 | Damon ......................... | 33/510 |
| 5,246,519 A | | 9/1993 | McCormick | |
| 5,680,709 A | * | 10/1997 | Stone ............................ | 33/613 |
| 6,317,996 B1 | * | 11/2001 | Myers et al. .................. | 33/566 |
| 6,347,654 B1 | * | 2/2002 | Koch ............................ | 156/391 |
| 6,360,448 B1 | * | 3/2002 | Smyj ............................ | 33/562 |
| 6,514,588 B2 | * | 2/2003 | Rosenbaum et al. .......... | 40/638 |
| 6,563,046 B1 | * | 5/2003 | Jarry et al. .................... | 174/50 |

FOREIGN PATENT DOCUMENTS

| | | |
|---|---|---|
| DE | 37 22 096 A1 | 1/1988 |
| DE | 40 09 527 A1 | 9/1991 |
| DE | 42 34 418 A1 | 4/1994 |
| DE | 19727600 A1 | 1/1999 |
| DE | 198 46 969 A1 | 10/1999 |
| DE | 198 29 833 A1 | 1/2000 |
| DE | 10016088 A1 | 10/2001 |
| EP | 0 461 643 A2 | 12/1991 |
| EP | 0 513 579 A1 | 11/1992 |
| EP | 1179576 A1 | 2/2002 |

* cited by examiner

*Primary Examiner*—Christopher W. Fulton
*Assistant Examiner*—Yaritza Guadalupe
(74) *Attorney, Agent, or Firm*—Birch, Stewart, Kolasch & Birch, LLP

(57) ABSTRACT

An assembly aid in which a self-adhesive component can be placed and with which the component is precisely positioned on or relative to a surface for adhesion. The assembly aid having a template-like structure. Thus, the assembly aid has an opening that is matched to the component, wherein the component itself is held within the opening and is thus fixed exactly in place in the template. The assembly template has an outside contour by which precise positioning for attachment of the component to the adhesion surface is accomplished. Not until it has been definitively positioned is the component, which can be freely moved with the template over the surface, pressed out of the template against the adhesion surface.

22 Claims, 1 Drawing Sheet

ASSEMBLY AID

This nonprovisional application claims priority under 35 U.S.C. § 119(a) on Patent Application No. 102 26 302.7 filed in Germany on Jun. 13, 2002, which is herein incorporated by reference.

BACKGROUND OF THE INVENTION

1. Field of the Invention

The present invention relates to an assembly aid for mounting self-adhesive components on glass panes or similar surfaces.

2. Description of the Background Art

A self-adhesive component is known from DE 198 46 969 A1. The component described therein, a rain sensor in a sensor housing, is affixed to a motor vehicle windshield by means of a transparent adhesive film. Placement of the component on the glass pane is conventionally done directly by hand. This has the disadvantage, in addition to a imprecise placement, that once adhered it is no longer possible to move the component to a different or better position.

SUMMARY OF THE INVENTION

It is therefore an object of the present invention to provide an assembly aid for achieving precise positioning of a component.

The invention is based on the concept of creating an assembly aid in which a component can be placed and with which the component can be positioned precisely on or relative to a surface for adhesion. To this end, the assembly aid has a template-like structure, and has an opening that is matched to the component, by which the component itself is held within the opening and is thus fixed exactly in place in the template. The assembly template itself has an outside contour that in turn results in precise positioning for attachment of the component to the adhesion surface. Not until it has been definitively positioned is the component, which can be freely moved with the template over the surface until that time, pressed out of the component and against the adhesion surface.

The assembly template makes easy placement and installation possible, in particularly for self-adhesive components.

The assembly aid is intended primarily for attaching rain, humidity and/or fog sensors to a glass pane, but can also be used for components that are round, angular, or other shapes, as well as for attaching components or labels on non-glass surfaces.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus, are not limitive of the present invention, and wherein.

DETAILED DESCRIPTION OF THE PREFERRED EMBODIMENTS

Figure 1:
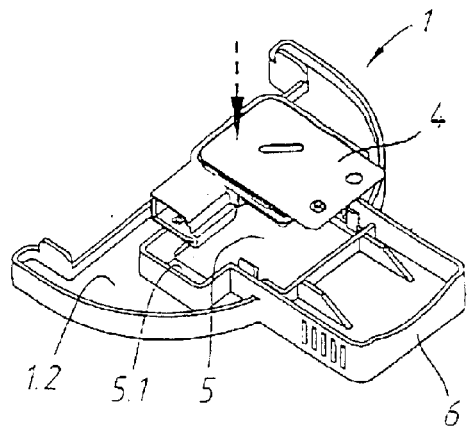
FIG. 1 shows an assembly template and placement of a component in the assembly template according to a preferred embodiment of the invention.
Figure 2:
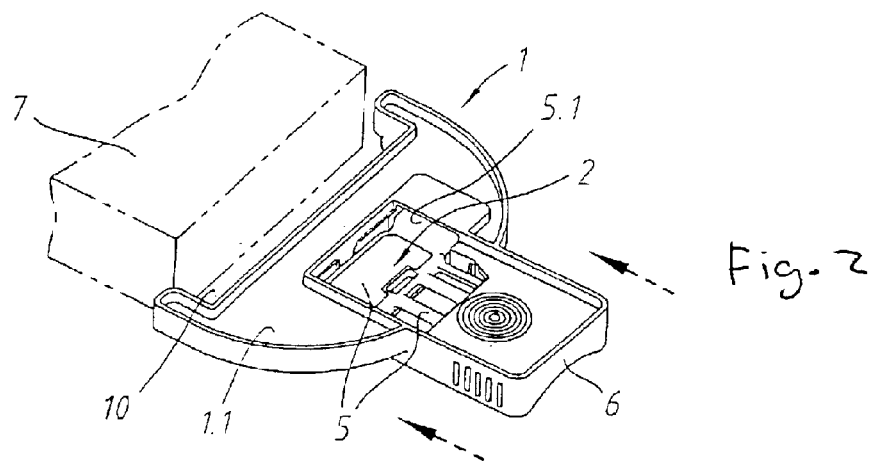
FIG. 2 is an illustration of the component being positioned on a surface.
Figure 3:
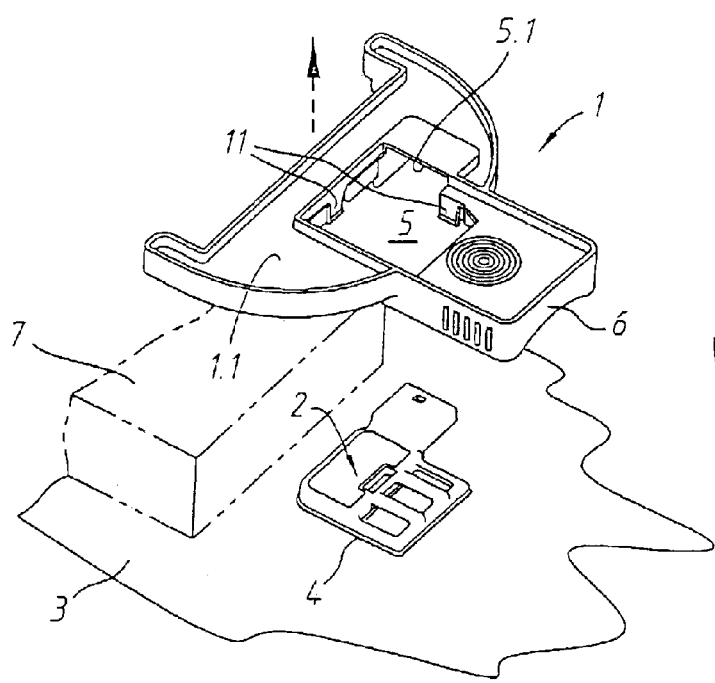
FIG. 3 is an illustration of the positioned component with the assembly template being withdrawn.

Shown in FIGS. 1 to 3 is an assembly aid 1 in the form of an assembly template for attaching a component 2 to a surface 3 (see FIGS. 2, 3), for example a windshield of an automobile.

FIG. 1 shows the assembly template 1 in a bottom view, specifically showing a bottom side 1.2 of the assembly template 1 with an inserted component 2 and a self-adhesive surface 4 having a protective film. To accommodate the component 2, the assembly template 1 has an opening 5 whose inside contour matches the outside contour of the component 2. The component 2 is preferably held in a self-supporting manner. However, a support surface 5.1 can also be provided inside the opening 5 upon which a small area of the component 2 can rest. This measure achieves the result that the component 2 is held in the opening 5 at a defined distance from the bottom side 1.2, with locking tabs 11, for example, keeping the component 2 from falling out of the assembly template 1. A grip 6 is provided on the assembly template 1 for better handling.

FIG. 2 is a top view illustration of the positioning of the assembly template 1 with component 2 onto a surface 3. The component 2 can be seen and handled via the opening 5 of a top side 1.1 of the assembly template 1. It is advantageous if the adhesive surface 4 of the component 2 has a little clearance instead of terminating at the bottom side of the assembly template 1. In this way, the assembly template 1 and the component 2 can be moved over the surface 3 for precise positioning, with the component 2 being suspended above the surface 3. Once the desired position has been achieved, the component 2 is pressed against the surface 3, by, for example, an external force such as finger pressure, far enough out of the assembly template 1 so that the template can then be lifted away from the component 2 without difficulty, yet the component 2 remains positioned in place, as shown in FIG. 3, for example.

In a further embodiment, the assembly template 1 has an alignment section 10 that, in the illustrated example is in the form of a bifurcation whose purpose is for better positioning or orientation of the component 2 relative to an already existing component 7. In the present example, this bifurcated alignment section 10 partially duplicates a squared form of the component 7. In the event of a round or triangular outside contour, the bifurcation 10 can be adapted thereto.

The assembly template 1 can also have additional openings if desired.

The assembly template 1 is preferably composed of a plastic part, which can be manufactured by injection molding, for example. However, other materials are also possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An assembly aid for mounting a component having a self-adhesive surface onto a surface, the assembly aid comprising:

a template-like structure having an opening therein to accommodate the component, wherein the opening contours a portion of an outer contour of the component such that the component is held within the opening, and wherein the self-adhesive surface of the component does not terminate at a bottom side of the template, a portion of the bottom side of the template slidably contacting the surface and facilitating positioning of the component onto the surface.

2. The assembly aid according to claim 1, wherein locking tabs for fixing the component in place in the opening are provided in the opening.

3. The assembly aid according to claim 1, wherein a grip is provided above the opening for better handling.

4. The assembly aid according to claim 1, wherein a bifurcation is provided that is adapted to a physical shape of an additional component or location that is used to orient the assembly aid during positioning, wherein the bifurcation is provided on an edge of the assembly aid.

5. The assembly aid according to claim 1, wherein a support surface is provided within the opening for part of the component.

6. The assembly aid according to claim 1, wherein the component is a rain, humidity, or fog sensor.

7. The assembly aid according to claim 1, wherein the surface is a glass pane of a motor vehicle.

8. The assembly aid according to claim 1, wherein the component is fixedly held in the opening by locking tabs.

9. The assembly aid according to claim 1, wherein the component is held within the opening such that between the self-adhesive surface of the component and the surface a predetermined gap is formed facilitating positioning of the component onto the surface.

10. A mounting apparatus comprising:

an upper and lower surface, the lower surface slidably contacting a mounting surface; and an aperture for receiving a component therein, said aperture protruding said upper and lower surface, wherein the component is fixedly held within said aperture, such that a lower surface of the component is above the mounting surface, thereby forming a gap between the lower surface of the component and the mounting surface.

11. The mounting apparatus according to claim 10, wherein the mounting apparatus further comprises an alignment section having a contour that substantially matches at least a portion of an object, which facilitates alignment of the mounting apparatus relative to the mounting surface, the alignment section being provided on an edge of the mounting apparatus 10.

12. The mounting apparatus according to claim 10, wherein an external force extrudes the component from said aperture onto the mounting surface.

13. The mounting apparatus according to claim 10, wherein a holding device is provided on the mounting apparatus at an edge of said aperture for fixedly holding the component therein.

14. The mounting apparatus according to claim 10, wherein the lower surface of the component has an adhesive.

15. The mounting apparatus according to claim 10, wherein said aperture has a contour that substantially matches an outer periphery of the component.

16. The mounting apparatus according to claim 10, wherein the mounting surface is a vehicle windshield.

17. The mounting apparatus according to claim 10, wherein the component is a sensor.

18. A method of aligning and placing a component onto a surface comprising:

inserting the component into an aperture of a mounting apparatus, the aperture protruding an upper surface and a lower surface of the mounting apparatus, the component being inserted into the aperture through the upper surface of the mounting apparatus;

positioning the mounting apparatus to a desired location on the surface; and extruding, via an external force, the component from the aperture of the mounting apparatus, the component being extruded through the lower surface of the mounting apparatus.

19. The method according to claim 18, wherein the surface is a vehicle windshield.

20. The method according to claim 18, wherein the component is a sensor.

21. A mounting apparatus for mounting a component, the mounting apparatus comprising:

an upper surface and a lower surface, the upper surface and the lower surface being substantially parallel to one another, the lower surface slidably contacting a mounting surface for facilitating positioning of the component to a specific location on the mounting surface; and an aperture being provided in the mounting apparatus, the aperture extending through the mounting apparatus from the upper surface to the lower surface, the component being fixedly held within the aperture such that an adhesion surface of the component is between the upper surface and the lower surface of the mounting apparatus, the adhesion surface of the component providing for adhesion to the mounting surface, wherein the component is positioned to the specific location on the mounting surface by ejecting the component from the mounting apparatus through the lower surface of the mounting apparatus.

22. A sensor positioning device comprising:

an upper surface and a lower surface, the lower surface slidably contacting a vehicle windshield; and an aperture for receiving a sensor therein, the aperture protruding the upper surface and the lower surface, wherein the sensor is fixedly held within the aperture, such that an adhesion surface of the sensor is between the upper surface and the lower surface of the sensor positioning device during positioning of the sensor on the vehicle windshield.

* * * * *